No. 870,495. PATENTED NOV. 5, 1907.
F. B. COOK.
AUTOMATIC RESOLDERING DEVICE FOR ELECTRICAL PROTECTIVE APPARATUS.
APPLICATION FILED MAY 11, 1907.
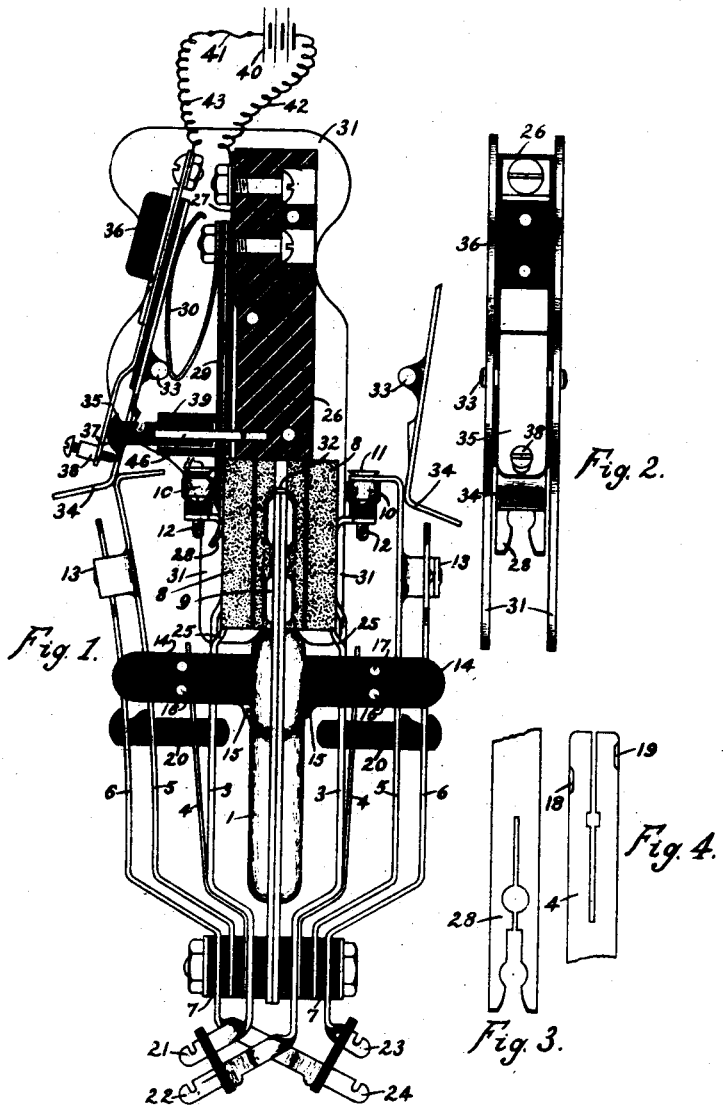
WITNESSES:
Frederick R. Parker.
Bert G. Cable.
INVENTOR:
Frank B. Cook.

UNITED STATES PATENT OFFICE.

FRANK B. COOK, OF CHICAGO, ILLINOIS.

AUTOMATIC RESOLDERING DEVICE FOR ELECTRICAL PROTECTIVE APPARATUS.

No. 870,495.          Specification of Letters Patent.          Patented Nov. 5, 1907.

Original application filed March 8, 1906, Serial No. 304,929. Divided and this application filed May 11, 1907. Serial No. 373,140.

*To all whom it may concern:*

Be it known that I, FRANK B. COOK, a citizen of the United States of America, residing at Chicago, in the county of Cook and State of Illinois, have invented a new and useful Automatic Resoldering Device for Electrical Protective Apparatus, of which the following is a specification, reference being had to the accompanying drawings, illustrating same.

This application is a division of my application for Letters Patent on electrical protective apparatus filed March 8, 1906, Serial No. 304,929.

My invention relates to protective apparatus for protecting electrical circuits and apparatus, such as telephone, telegraph or fire alarm circuits and apparatus, from injury from abnormally large currents of electricity from electric light, trolley or power circuits, these currents being generally termed "sneak currents", in combination with means for automatically repairing and resetting the protective apparatus to enable same to be operated repeatedly without replacing any of the parts after operation.

The principal objects of this invention are to provide simplicity of construction in apparatus of the character specified; to provide an arrangement of such apparatus which is very efficient and thoroughly reliable in its operation; to provide an improved device for automatically resetting and resoldering the protective apparatus in operative condition and position after operation preparatory for another operation, so that the protective apparatus may be used over and over again repeatedly; and to provide simplicity of construction and efficiency in such a resetting and resoldering device. Other objects will be apparent from the following specification.

In the accompanying drawings illustrating the preferred form of my invention, Figure 1 illustrates a pair of sets of protective apparatus mounted on opposite sides of a ground plate, the apparatus on the right hand side being shown in a set position ready for operation, and the apparatus on the left hand side being shown in an operated position, all in connection with a cross-sectional view of the resetting and resoldering device inserted into the protective apparatus in position for resetting the protective apparatus on the left hand side of the ground plate, portions of the resetting and resoldering device being shown in elevation and a source of current supply for resoldering the protective apparatus being wired to the resetting and resoldering device; Fig. 2 is a left hand edge elevation of the resetting and resoldering device shown in Fig. 1; Fig. 3 is a detail view of a portion of one of the contact springs of the resetting and resoldering device; and Fig. 4 is a detail view of a portion of one of the spring members of the protective apparatus of Fig. 1.

Like characters refer to like parts in the several figures.

Referring to the drawings, 1 is a ground plate, preferably made of two formed pieces of sheet metal secured together, upon which are mounted spring members 3 3, 4 4, 5 5, and 6 6, suitably insulated from each other by insulation 7. Springs 3 3 are preferably the line springs and are adapted to hold the lightning arresters 8 8 in place against the ground plate 1, preferably as shown, between projections 9 9 on the ground plate which hold the pairs of lightning arresters apart. Ground plate 1 may be of any desirable length to accommodate a series of pairs of sets of the protective apparatus. The free ends of line springs 3 3 are preferably adapted to receive the thermal protector devices 10 10 which are preferably connected to springs 3 3 by screw connection as shown.

When the apparatus is set for operation, the free end of spring 5 is preferably connected with and soldered to the thermal protector 10 by an easily-fusible solder, as shown on the right hand side of Fig. 1. The thermal protector 10 is preferably constructed with an inclosing shell electrically connected with the terminal end 11 and insulated from the screw end 12. The shell of the protector 10 incloses the heat-producing means which is connected in a series circuit with the terminal end 11 and the screw 12. Each spring 5 is provided with a contact portion 13 adapted to engage a contact on the switchboard spring 6 to form a separable contact adapted to receive a test-plug for opening the circuit between the switchboard and the line for testing. This contact at 13 is preferably made of platinum so as not to corrode. The line circuit extends through line spring 3, the thermal protector 10, the free end of spring 5, contact portion 13, and switchboard spring 6, to the switchboard.

Insulating strips 14 14, preferably made of hard rubber, are preferably inserted through the ground plate 1 between pairs of sets of the protective apparatus, to keep the several springs of each set in alinement and to separate the springs of each pair from the springs of the adjacent pairs. These insulating strips 14 14 are each provided with a shoulder 15 adapted to rest against the ground plate 1. The strips 14 14, taken in a series, are alternately inserted through the plate 1 in opposite directions, so that the shoulders 15 15 on the first, third, fifth etc., bear against the plate 1 on one side thereof, and those on the second, fourth, sixth, etc., bear against the plate 1 on the opposite side thereof. The strips 14 14 are bound together by contact rods 16 and 17 which extend through the series. When the strips 14

14 are thus bound together they are rigidly held in place, due to the shoulders 15 15 on opposite sides of plate 1. One of the rods 16 or 17 may be a portion of an alarm circuit and the other rod 16 or 17 may be and is preferably connected direct to ground.

When the protective apparatus operates, as shown on the left of Fig. 1, contacts 18 and 19 of spring 4 engage the rods 16 and 17, respectively, independently, due to spring 4 being split as shown. Each insulator 20 extends through springs 3, 4, 5 and 6 and is arranged so that the operation of springs 5 and 6 controls the operation of spring 4, thereby causing contacts 18 and 19 of spring 4 to firmly engage rods 16 and 17. Spring 4 engaging rods 16 and 17 also limits the extent of the operation of springs 5 and 6. Spring 4 is normally out of contact with rods 16 and 17, as shown on the right of Fig. 1. Line springs 3 3 terminate in line terminals 21 22, and switchboard springs 6 6 terminate in switchboard terminals 23 24, terminals 22 and 24 being crossed-over as shown, to arrange line terminals 21 and 22 together and switchboard terminals 23 and 24 together. The line conductors are preferably connected to terminals 21 22 and conductors leading to the central station switchboard, in telephone systems or the like, are preferably connected to terminals 23 24. Line springs 3 3 are provided with projections 25 25 thereon to form stops for the outer carbon blocks of the lightning arresters 8 8, to correspond with the stops formed by the ground plate 1 for the inner carbon blocks of the lightning arresters.

The resetting and resoldering device illustrated comprises a support of insulation 26, preferably of hard rubber, upon which are mounted spring parts 27, 28, 29 and 30, preferably as shown, springs 28 and 29 being insulated from each other, and spring 27 being adapted to make contact with spring 28 near its free end but being normally insulated therefrom by this contact being broken. The support 26 carries insulating side portions 31 31 secured to opposite sides thereof, each side portion 31 being slotted as at 32 to straddle the edge of the ground strip 1 of the protective apparatus when the resetting device is applied to the protective apparatus to reset a protector, the side portions 31 31 also straddling a pair of lightning arresters 8 8 to hold the resetting device in place. A pin 33, acting as a pivot, extends through the side portions 31 31, preferably as shown, and carries springs 34 and 35 and an insulated thumb piece 36, the springs 34 35 being normally held out of contact with each other by an insulating pin 37 but being adapted to make contact at the adjustable contact 38 when the thumb piece 36 is depressed. The insulating pin 37 carries a metallic pin 46 which extends into the insulating support 26 as a guide, and an insulating sleeve 39 which limits the operation of spring 34 caused by the V-shaped spring 30 when the thumb piece 36 is released. Pin 33 may be soldered to spring 34 so as to secure springs 34 and 35 in place. The battery 40 and a fuse 41 are preferably connected in circuit with springs 27 and 35 by suitable binding screws, as shown. Spring 34 may be constructed to bear squarely against sleeve 39 when in the position shown on the right hand side of Fig. 1. The free end of spring 28 is preferably formed as shown in Fig. 3, so as to firmly grasp the free end of line spring 3 when inserted into the protective apparatus as shown in Fig. 1. When the resetting device is inserted into the protective apparatus to reset same, spring 28 makes electrical connection with line spring 3, and spring 34 makes electrical connection with spring 5, as shown in Fig. 1, contact 38 then making contact with spring 34, and spring 27 then making contact with spring 28.

The operation of the protective apparatus is as follows: When an abnormally large current traverses a thermal protector for a sufficient length of time, this current generally coming from a line conductor through line spring 3, it heats the protector and finally softens or melts the heat-susceptible material securing the free end of spring 5 to the protector 10, and thereby allows spring 5 to release from the protector and operate with switchboard spring 6 to the position shown on the left hand side of Fig. 1, thus opening the circuit between the line and switchboard and thereby protecting the switchboard circuit and apparatus from the abnormally large current. The length of time required to operate the thermal protector depends upon the strength of current traversing same. When springs 5 and 6 operate as just described, the movement of insulator 20 allows spring 4 to operate to the position shown on the left hand side of Fig. 1, so that contacts 18 and 19 thereof engage the conducting rods 16 and 17 and thereby ground the line spring 3 and close the alarm circuit between the said rods to actuate the alarm in the usual manner to indicate the operation of the protective apparatus. It will be seen that the line is now grounded through line spring 3, spring 4 and ground rod 16 or 17, thus diverting the objectionable current to earth. In case a high-potential charge or current of electricity comes in over a line wire, it will jump through a carbon lightning arrester 8 to the ground plate 1, in the usual manner. This open-circuit path to earth through the lightning arrester 8 protects the switchboard and apparatus thereof from the high-potential current or charge. When spring 5 leaves the thermal protector, the solder in the annular recess at end 11 of the protector is disarranged to some extent and partially fills up the annular recess, becoming cool and solid in this position. When it is desired to set the protector to operative position for another operation, the resetting device is inserted into the protective apparatus as shown in Fig. 1, the thumb piece 36 being first depressed against the tension of spring 30 to throw springs 34 and 35 to the position shown in Fig. 1 and close the contacts between springs 34 and 35, and springs 27 and 28, respectively. As soon as the resetting device is fully inserted into the protective apparatus, as shown in Fig. 1, the thumb-piece 36 is released, whereupon spring 30 throws the free end of spring 34 toward the protector, which operation depresses spring 5 until the free end thereof comes in contact with the solder in the neck portion of protector 10. Now the circuit of battery 40 is closed through conductor 42, spring 27, the free end of spring 28, the free end of line spring 3, the end 12 of thermal protector 10, the heat-producing means of protector 10, the solder in the neck portion of protector 10, the free end of spring 5, a portion of the free end of spring 34, adjustable contact 38, spring 35, conductor 43, and fuse 41. The current from battery 40 now traverses the heat-producing means of protector 10 and thereby causes same to heat and soften the heat-susceptible material in the neck portion of the protector. When the heat-susceptible material is thus softened, spring 30 causes spring 34 to depress spring 5 still further until it is fully depressed to operative position as shown on the right hand side of Fig. 1. When spring 5 is fully reset to operative position, insulating pin 37 breaks the contacts between springs 34 and 35 and springs 27 and 28, respectively, due to the pressure of spring 35 against the head of pin 37 and the pressure of the inner end of pin 37 against the free end of spring 27, and thereby disconnects battery 40 from each of the springs 34 and 28, thus cutting the current of battery 40 from the thermal protector 10. The heat-susceptible material at end 11 of protector 10 now cools and hardens and thereby resolders the free end of spring 5 to the protector 10 as shown on the right hand side of Fig. 1. When the solder has thoroughly cooled, which requires only a very short time, the re-setting device may be removed from the protective apparatus. The protective apparatus is now in position and condition to be operated again, as originally, in case an abnormally large current now traverses protector 10. Fuse 41 is placed in the circuit of battery 40 so as to blow and open the circuit in case a short-circuit is established through the resetting device or protective apparatus during the use of the device in resetting the protector. Contact 38 may be adjusted so as to engage spring 34 at any desirable stage of the operation of the latter. It will readily be seen that the operation and resetting of the thermal protector may be repeated as many times as desired.

The resetting of the protective apparatus also tests the serviceable condition of the thermal protector 10, for the reason that if it properly heats and resolders, it must be in condition to operate again; but if it will not properly heat and resolder, it shows that the circuit through same is either open, short-circuited, or in some way injured.

I do not wish to limit this invention to the exact details of construction as herein shown and described, as many modifications and changes may be made therein without departing from the scope of the invention. The accompanying drawings simply illustrate one particular form of thermal protector and apparatus therefor for carrying out my invention.

What I claim as my invention and desire to secure by Letters Patent is:

1. A repairing device for thermal protectors of the character described, comprising two pairs of normally separated spring members, means for normally holding the pairs of spring members in this separated relation, and a thumb-piece adapted to be depressed whereby the contact between each pair of spring members is closed.

2. A repairing device for apparatus of the character described, comprising two pairs of contact members and means for normally holding the members of each pair in separated relation, the said means permitting the members of each pair to make electrical connection with each other when the repairing device is connected with the said apparatus, for purposes substantially as described.

3. A repairing device for apparatus of the character described, comprising two pairs of contact members, means for normally holding the members of each pair in separated relation and means for operating one of the contact members when the repairing device is connected with the said apparatus, whereby the contact members of each pair are electrically connected with each other.

4. A repairing device for thermal protectors, comprising two pairs of contact members normally held out of contact with each other, an operating spring between the pairs of contact members, and a thumb-piece adapted to be depressed against the tension of the operating spring whereby the members of each pair are electrically connected with each other.

5. A repairing device for apparatus of the character described, comprising pairs of contact members, means for normally holding the members of each pair in separated relation, a spring acting on one of the said contact members, and means whereby the latter said contact member is operated against the tension of the said spring when the repairing device is connected with the said apparatus, whereby the contact members of each pair are electrically connected with each other.

6. A repairing device for electrothermal protectors, comprising pairs of contact members, one said pair being pivoted near its center, means normally holding the contact members of each pair in separated relation, an operating spring between the pairs of contact members acting on the said pivoted pair, and means for operating the said pivoted pair against the tension of the operating spring whereby the contact members of each pair are electrically connected with each other, for purposes substantially as described.

7. A repairing device for electrothermal protectors of the character described, comprising contact members for closing a circuit through a protector, one of the contact members being pivoted, a spring member operating on the pivoted contact member to cause the latter to close a circuit through a protector, a suitable source of electricity connected in circuit with the said contact members and means whereby each of the said contact members is disconnected from the said source when the circuit through the protector has been closed a sufficient length of time.

8. A repairing device for electrothermal protectors of the character described, comprising contact members for closing a circuit through the protector, means for operating one of the contact members when the said device is connected with a protector, a suitable source of electricity connected in circuit with the said contact members, and means whereby each of the said contact members is automatically disconnected from the said source when the circuit through the protector has been closed a sufficient length of time.

9. In a resetting and resoldering device for thermal protectors, pairs of contact members normally held in separated relation but adapted to be electrically connected with each other in pairs when the said device is connected with a protector, and an adjustable contact for at least one of the said pairs.

10. In a resoldering device for thermal protectors of the character described, a pair of spring members connected in circuit with a source of electricity, members for engaging the protective apparatus to reset same and close the circuit of the said source through the protector for resoldering, means for normally holding the said spring members out of contact with the said engaging members, an actuating spring, and means for overcoming the tension of the said actuating spring whereby the circuit is closed between the said spring members and engaging members when it is desired to reset the protector.

11. In a resoldering device for thermal protectors of the character described, a pair of spring members connected in circuit with a source of electricity, members for engaging the protective apparatus to reset same and close the circuit of the said source through the protector for resoldering, means for normally holding the said spring members out of contact with the said engaging members, and means whereby connecting the said device with the protector closes the circuit between the said spring members and engaging members, for purposes substantially as described.

12. A resetting device for thermal protectors of the character described, comprising pairs of springs, one pair being pivoted near its center and carrying a thumb-piece adapted to be depressed, an operating spring between the said pairs acting against pressure on the thumb-piece, and means near the free ends of the pairs of springs adapted to hold the springs of each pair out of contact with each other when the pressure on the thumb-piece is removed and to allow the springs of each pair to make contact with each other when sufficient pressure is applied to the thumb-piece to overcome the tension of the operating spring.

As inventor of the foregoing, I hereunto subscribe my name in the presence of two subscribing witnesses, this 6th day of May 1907.

FRANK B. COOK.

Witnesses:
FREDERICK R. PARKER,
C. C. NEWBURN.